United States Patent [19]

Ohashi et al.

[11] Patent Number: 4,643,442
[45] Date of Patent: Feb. 17, 1987

[54] FLUID SUPPLY SYSTEM FOR WORKING VEHICLES

[75] Inventors: Ryota Ohashi, Sakai; Masahisa Kawamura, Amagasaki; Koichiro Fujisaki, Kobe, all of Japan

[73] Assignee: Kanzaki Kokyukoki Mfg. Co., Ltd., Amagasaki, Japan

[21] Appl. No.: 761,886

[22] Filed: Aug. 2, 1985

[30] Foreign Application Priority Data

Sep. 17, 1984 [JP] Japan .................. 59-195143

[51] Int. Cl.$^4$ .......................... A01B 59/043
[52] U.S. Cl. .................. 280/461 A; 91/530; 172/439
[58] Field of Search .......... 280/261 A, 260 A, 256 A; 172/75, 74, 439, 125, 482, 491, 680; 91/530

[56] References Cited

FOREIGN PATENT DOCUMENTS 55-145103 10/1980 Japan .
55,174208 12/1980 Japan .
57-146502 9/1982 Japan .
57-158307 10/1982 Japan .
57-186772 11/1982 Japan .
57-201109 12/1982 Japan .
58-194255 12/1983 Japan .
59-178007 11/1984 Japan .

Primary Examiner—John A. Pekar
Attorney, Agent, or Firm—Tilton, Fallon, Lungmus & Chestnut

[57] ABSTRACT

In a working vehicle having hydraulic lift cylinder (39) on the top of rear end of the vehicle and seat (34) above the cylinder case (33) of such cylinder, fluid supply system is provided which supplies fluid from a single pump (47) to both of the lift cylinder and fluid-operated working implements. This system comprises first and second valve assemblies (49, 50), connected in series and mounted on the cylinder case (33), for controlling operation of the lift cylinder and working implements, respectively. The second valve assembly (50) is particularly disposed, for an easy mounting and piping, horizontally along a lateral direction within large open space before the cylinder head (81) of cylinder case (33) and below the seat (34) by mounting same to the front of head (81). For this, stop valve (52) for lift cylinder (39) is disposed within the head (81) so as to be displayed laterally and a vertical seating surface (96) is formed to the front of head (81).

6 Claims, 24 Drawing Figures

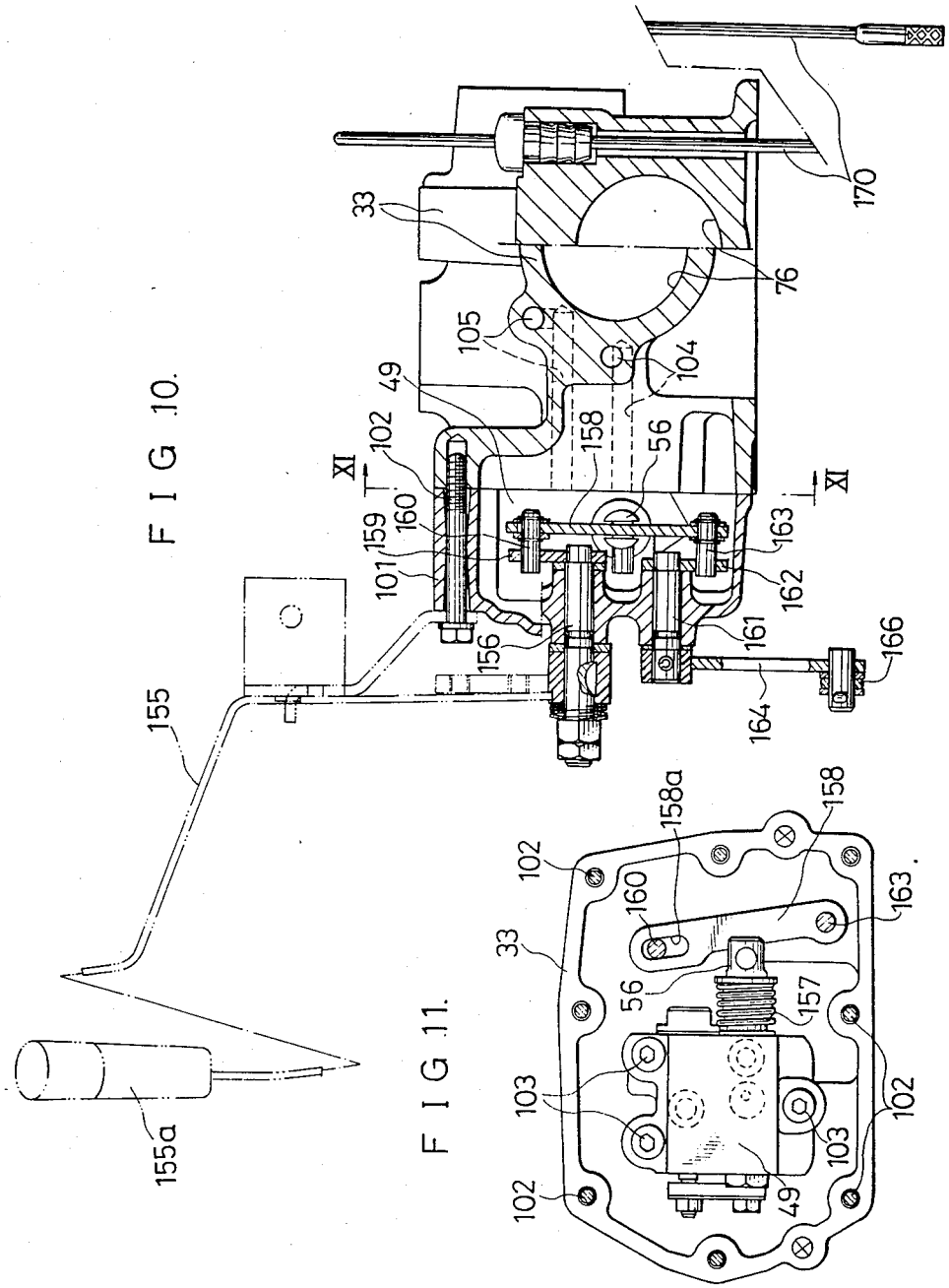

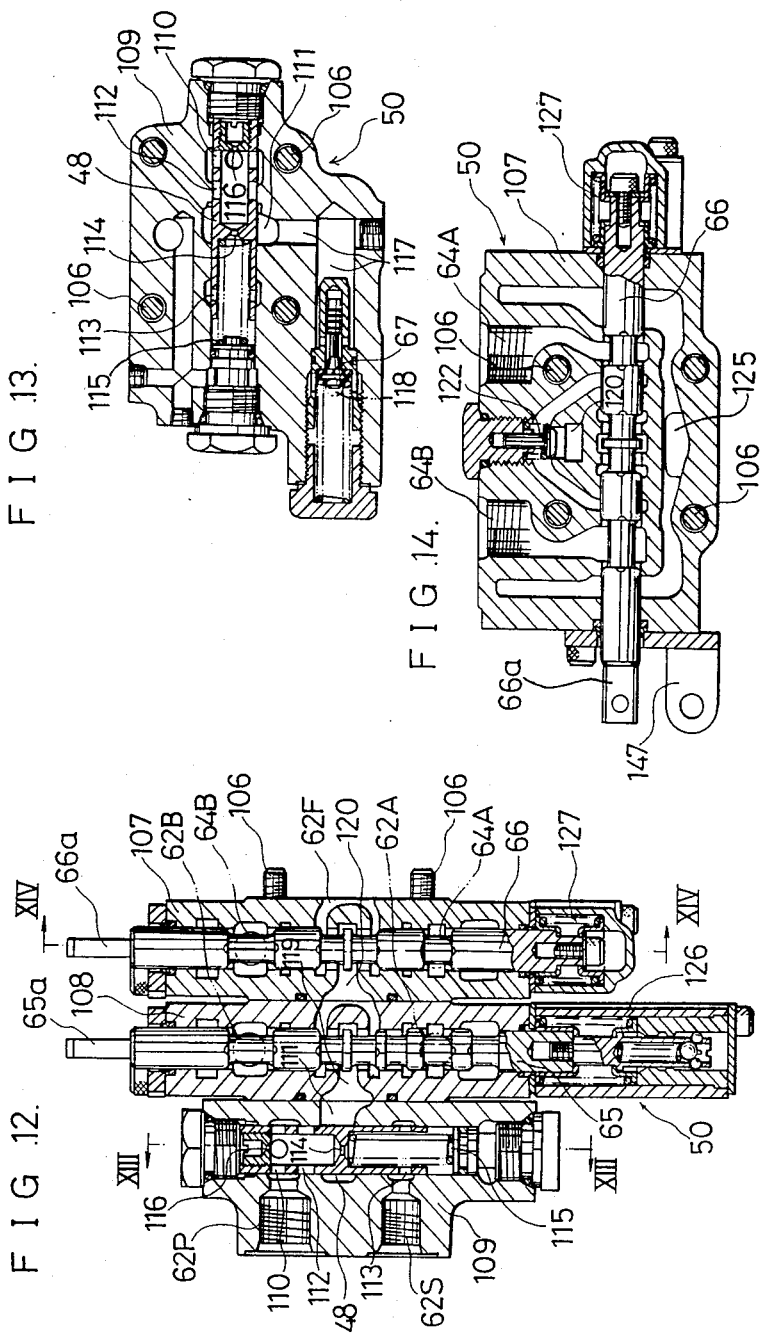

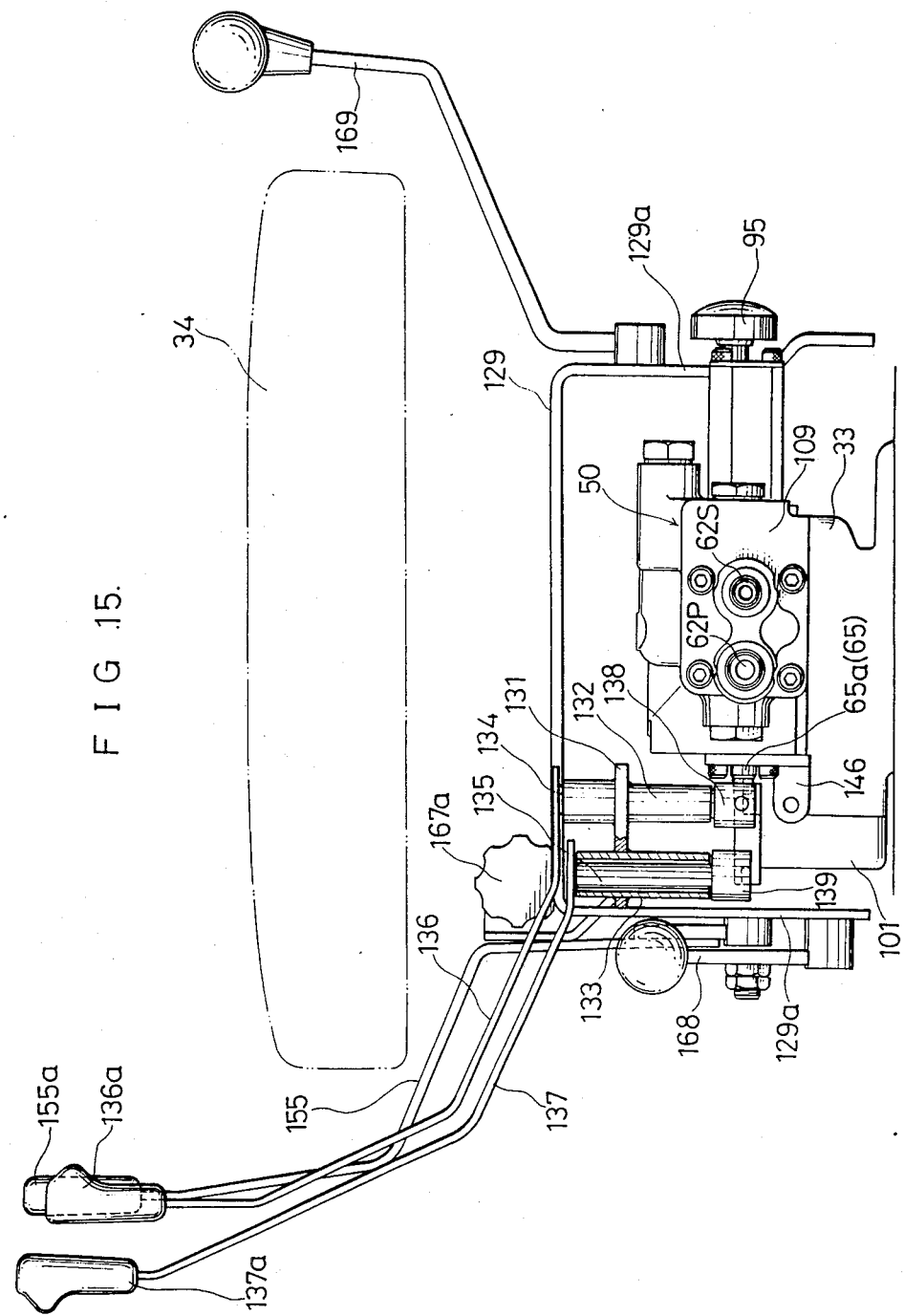

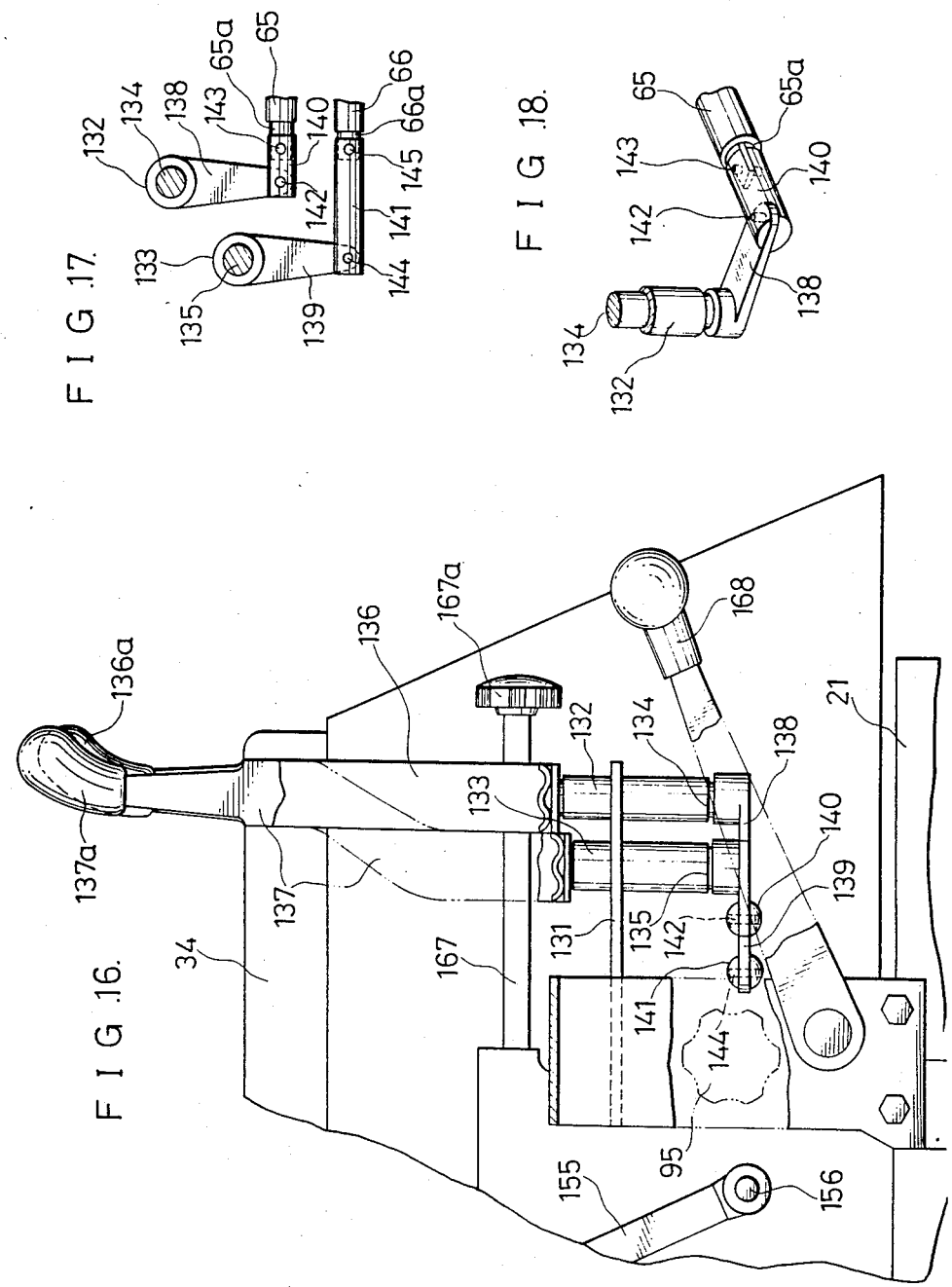

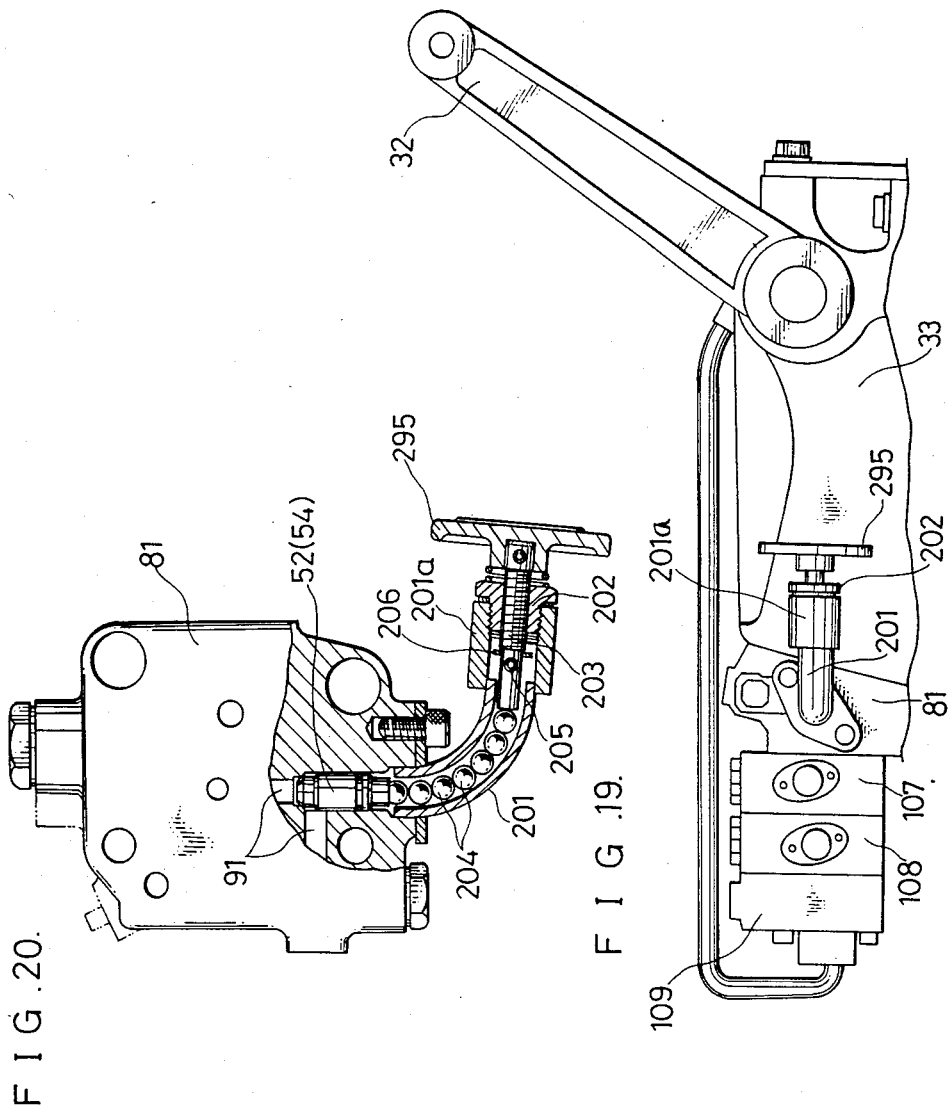

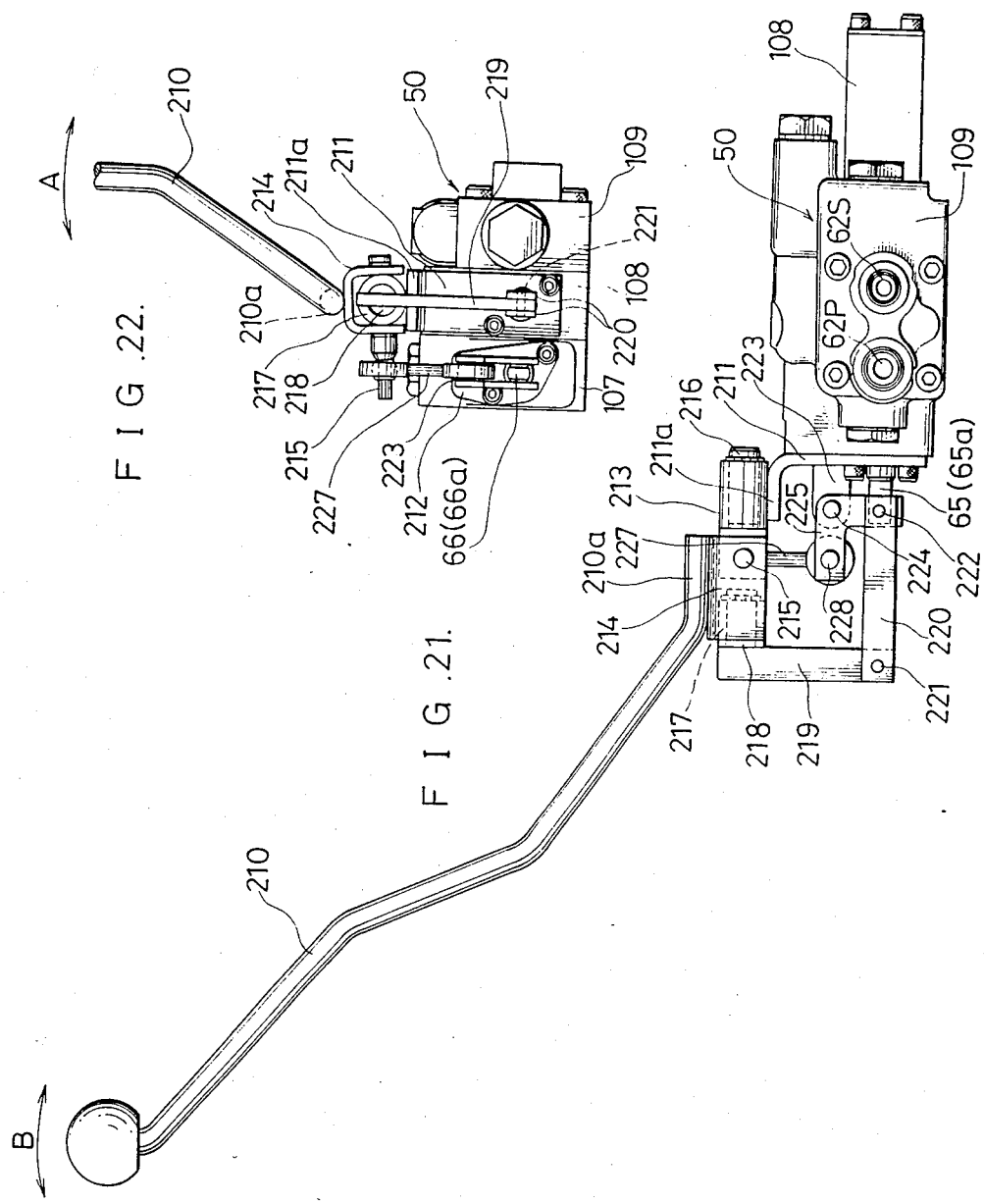

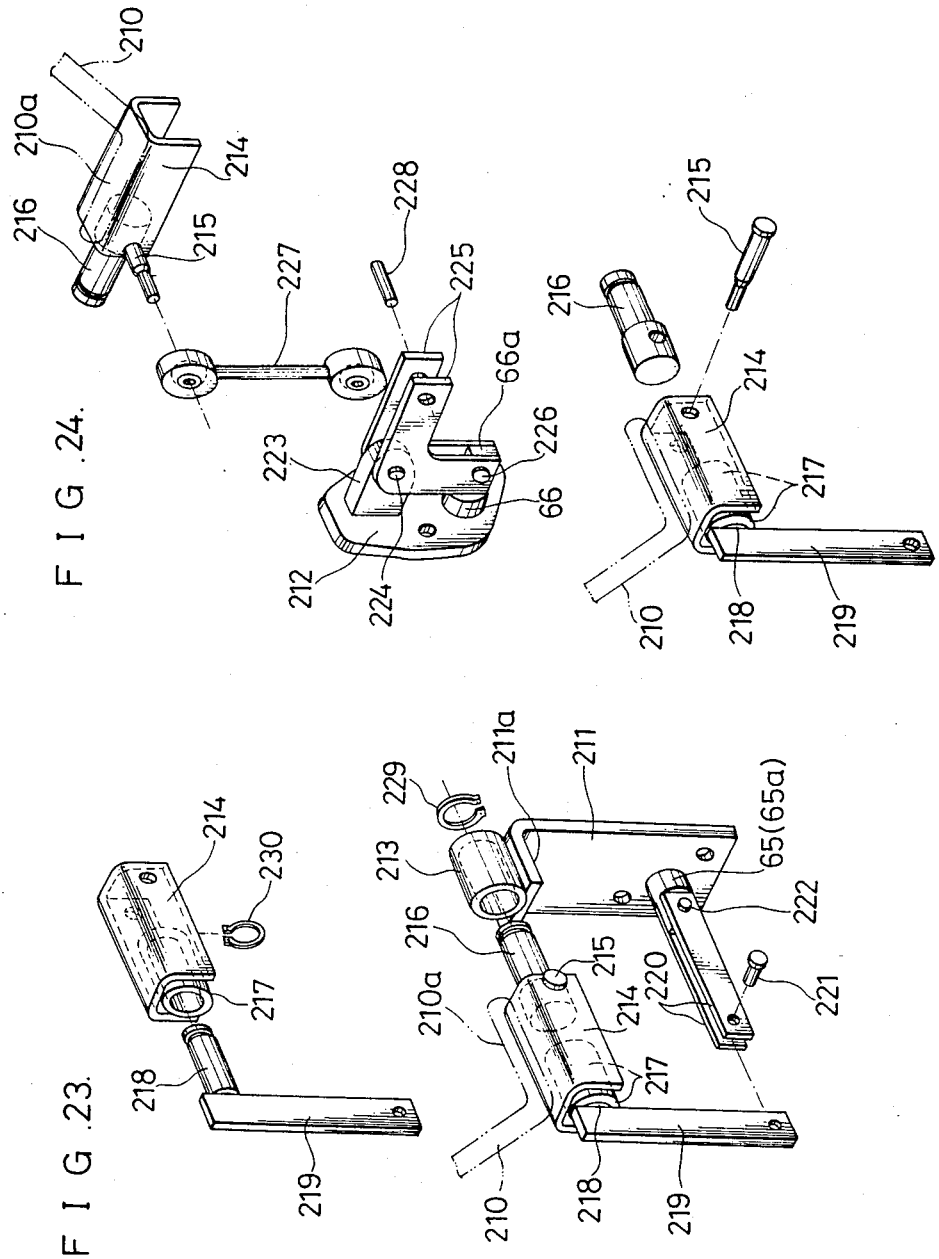

4,643,442

FLUID SUPPLY SYSTEM FOR WORKING VEHICLES

FIELD OF THE INVENTION

This invention relates to a fluid supply system for working vehicles performing for example goods loading, mowing, reaping, earth moving operations and the like.

More particularly, the present invention relates to a fluid supply system for use in a working vehicle having a hydraulic lift mechanism, mounted on the top of rear end portion of the vehicle frame for use in lifting and lowering a working implement drawn by the vehicle, and a seat located above a cylinder case of said hydraulic lift mechanism. The fluid supply system comprises: a first control valve assembly mounted on an outer wall surface of said cylinder case for controlling operation of said hydraulic lift cylinder, said wall surface extending along the longitudinal direction of the vehicle; a second control valve assembly for controlling operation of at least one fluid-operated working implement equipped to the vehicle, said second control valve assembly permitting therethrough supply of fluid to said first control valve assembly; and a single hydraulic pump for supplying operating fluid selectively to one of said hydraulic lift cylinder and said fluid-operated working implement.

PRIOR ART

In recent years, working vehicles for agricultural purposes or the like have often been used for various working purposes. By way of example, a tractor is equipped for such various working purposes selectively with a front loader, snow remover or the like at the front of the vehicle, a mid-mount mower or the like below a mid portion of the vehicle, and a rotary tiller, rear-mount mower, grass collector for collecting grass having been mowed by a mid-mount mower or the like at the rear of the vehicle. Many of such working implements are operated or actuated by fluid pressure.

It is well known to provide in a working vehicle having a hydraulic lift mechanism, mounted on the top of rear end portion of the vehicle frame for use in lifting and lowering a working implement drawn by the vehicle, with a fluid supply system which permits supply of fluid or fluid pressure from a single hydraulic pump selectively to a hydraulic lift cylinder of the lift mechanism and the working implement or implements equipped to the vehicle. In such working vehicle, it has been proposed in recent years to mount both of a first control valve assembly for controlling supply of fluid to the hydraulic lift mechanism and a second control valve assembly for controlling supply of fluid to the working implements on a cylinder case of the hydraulic lift mechanism. In this structure, fluid passage or passages to be provided between the two control valve assemblies for communication of fluid supplied by a single hydraulic pump may be formed within the cylinder case. Such structure contributes further to arrange control levers for both of the valve assemblies at positions where operator on a seat which is usually located above the cylinder case will handle or operate such levers with ease. Furthermore, the structure referred to above permits an easy formation of fluid passages for draining fluid from the control valve assemblies into a housing which forms a part of the vehicle frame and is also used as an oil reservoir or tank.

In such known structure, a first control valve assembly for controlling supply of fluid to the hydraulic lift cylinder has been mounted on an outer wall surface of the cylinder case, such as the outer surface of a side wall or bottom wall, which surface extends along the longitudinal direction of the vehicle. With respect to the arrangement of a second control valve assembly for controlling supply of fluid to working implements, there have been proposed two kinds of arrangements.

One type arrangement has the second control valve assembly attached to a cylinder head of the cylinder case, as shown in Japanese Laid-Open Utility Model Publication No. 145,103/80. The second control valve assembly disclosed in this publication is mounted on a side wall of the cylinder case in a vertical posture so that the ends of directional control valves in the assembly at which the ends control mechanism is associated or connected with the control valves are projected upwardly. The fluid supply system disclosed in such publication is fashioned such that fluid is supplied to and drained from the second control valve assembly through fluid passages in the cylinder head to which forwardly opening outlet ports of the second control valve assembly are provided.

Another arrangement of a second control valse assembly has such assembly mounted similarly to a first valve assembly for the lift cylinder on a side wall of the cylinder case, as shown in Japanese Laid-Open Utility Model Publication No. 174,208/80, Japanese Laid-Open Patent Publication No. 146,502/82, Japanese Laid-Open Utility Model Publication No. 158,307/82 and Japanese Liad-Open Utility Model Publication No. 201,109/82. In this arrangement, the second control valve assembly is disposed, for the purpose of providing control lever or levers for such assembly at a side of front end portion of the seat for an easy operation of such levers by and operator on the seat, in a horizontal posture along the longitudinal direction of the vehicle so that the ends of directional control valves in the assembly at which the ends control mechanism including the control levers is connected to the valves are projected forwardly from the valve assembly.

In any arrangement for a second control valve assembly referred to above, such valve assembly is located at a side of cylinder case of the hydraulic lift cylinder and away sidewardly from a location below a front end portion of the seat.

There is, however, little space space at such location for arranging the second control valve assembly because of the presence of fender from one of the rear wheels. This fact will make it relatively hard to mount the second control valve assembly at such location. More serious problems reside in that the limited space does not allow to increase in the number of directional control valves in the valve assembly in response to an increased number of working implements operated or actuated by fluid pressure and in that piping operation at such limited space is very difficult.

Further, a second control valve assembly arranged at location referred to above is apt to be exposed, even though it is located at the inner side of a rear wheel fender, to splashes of mud caused by a rear wheel and to rain water so that it is indispensable to provide a cover for protecting valve spools, pipe connectors and the like. Such cover may be provided by a support frame for control mechanism for operating the second control valve assembly but will make piping operation on the valve assembly more difficult.

OBJECTS OF THE INVENTION

Accordingly, a primary object of the present invention is to provide a novel fluid supply system of the type having the aforesaid two kinds of control valve assemblies mounted on a cylinder case of hydraulic lift cylinder, in which a second control valve assembly for working implement or implements is arranged so that it does not restrict mounting of such valve assembly and piping operation on the assembly.

Another object of the present invention is to provide a fluid supply system of the type set forth above in which the second control valve assembly is disposed at a location where it is seldom affected by splashes of mud and rain water and where it is protected by the seat.

A further object of the present invention is to provide a novel fluid supply system of the type set forth above which permits the effective use of the cylinder head of the cylinder case so as to simplify the structure for providing fluid passages.

A still further object of the present invention is to provide a novel fluid supply system of the type set forth above which permits to take a fluid pressure for another purpose from the same system with ease.

SUMMARY OF THE INVENTION

The present invention relates to a fluid supply system for working vehicles of the type set forth at the beginning and is characterized in that a stop valve (52) for said hydraulic lift cylinder (39) is disposed within a cylinder head (81) of said cylinder case (33) so as to be displaced along a direction across the vehicle by a handling means (94, 95; 203, 204, 295) which is arranged at a side of said cylinder case; and that the front of said cylinder head (81) is formed with a vertical seating surface (96) on which said second control valve assembly (50) is fixedly mounted in a horizontal pasture so as to be disposed below a front end portion of said seat (34) with an interval therebetween, one end (65a, 66a) of each of control valves (65, 66) in said second control valve assembly being projected outwardly toward a side opposite to said handling means (94, 95; 203, 204, 295) for associating control mechanism for said second control valve assembly.

Hydraulic lift cylinder for lifting and lowering a working implement having a large weight such as rotary tiller, pivotally connected to the rear of and drawn by a working vehicle, requires a stop valve for holding such working implement at a certain level for a relatively long time. Such stop valve is disposed within the cylinder head which is faced to the operating fluid chamber of a lift cylinder and is used for closing the end opening of such cylinder. According to the prior art, such stop valve is fashioned such that it is displaced approximately along the longitudinal direction of the vehicle so that one end of such valve at which the valve is handled or operated is projected outwardly from the front of cylinder case. Further, a hydraulic lift cylinder is disposed, in general, in a posture having some inclination toward a backward and downward direction for the purpose of reducing a longitudinal distance occupied by such cylinder so that the cylinder head and its front end surface in the hydraulic lift mechanism, according to the prior art are inclined correspondingly toward a backward and upward direction.

The art has not considered mounting an apparatus in the area in front of the cylinder head. The present invention utilizes the area in front of the cylinder head and located below a mid point of the seat and exactly between the left and right rear wheels. The present invention has firstly, an impediment to the effective use of the front of the cylinder head by providing a stop valve along a lateral direction so as to be handled at a side of the cylinder case. Secondly, the front of the cylinder head has been provided for the purpose of using effectively the large open space before such front of the cylinder head with a vertical seating surface. Such seating surface is used according to the present invention as a mounting surface for the second control valve assembly.

The second control valve assembly mounted in a horizontal posture on the front of cylinder head is located within the open space before the cylinder head and exactly between the left and right rear wheels or fenders therefor. Consequently, the control valve assembly may be mounted with ease and number of directional control valves in such valve assembly may be increased without particular restriction by enlarging width or thickness of the assembly along the longitudinal direction of the vehicle. Piping operation on the valve assembly will be carried out with ease by providing ports of such assembly so that some ports open forwardly at the open forward space and other ports open upwardly at the interval or space between the valve assembly and seat.

The second control valve assembly is located in itself at a location relatively far from the left and right rear wheels and further is convered from the upward by the seat so that it is seldom affected by splashes of mud caused by the rear wheels and by rain water. Owing to the structure that one end of each of control valves in the second control valve assembly is projected toward a side opposite to the handling means for stop valve, control mechanism for operating the control valves may be provided at such opposite side without any obstruction by the handling means of stop valve.

A cylinder head is employed in a hydraulic lift mechanism includes therein fluid passages, connected with control valve assembly for the hydraulic lift cylinder, and various valves directly associated with the lift cylinder such as stop valve referred to above, overload-relief valve for avoiding application of an excessive fluid pressure to the lift cylinder, slow-return valve means for making slow the downward movement of a working implement, which movement is caused by the weight of such implement itself, and the like together with fluid passages for connecting such various valves. Fluid passages for connecting the second control valve assembly toward the first control valve assembly for the lift cylinder as well as toward the inside of a housing forming a part of the vehicle and also used as an oil reservoir may be provided in such cylinder head in a fashion such that fluid passages in the cylinder head are directly communicated with corresponding fluid passages in the second control valve assembly at the interface between the cylinder head and second control valve assembly. Because the second control valve assembly and cylinder head are aligned with each other in the longitudinal direction of the vehicle, it is unnecessary to provide particular bends to such fluid passages for the direct communication of passages.

Because the second control valve assembly is disposed within a large open space before the front of the cylinder head, there will be caused no problem on the arrangement of such valve assembly even when the assembly is enlarged in thickness by incorporating therein a flow divider which divides fluid from a single hydraulic pump into two parts for supplying a part of such fluid to another fluid-operated apparatus. It is thus permitted by providing such flow divider to take fluid or fluid pressure for another fluid-operated apparatus, such as power cylinder in a power steering mechanism or fluid-operated clutch means in the transmission, from the same system with ease.

In an embodiment of the present invention, an arch-shaped frame for supporting the seat is fixedly mounted on the top of vehicle frame so that one of the legs of such frame is located at a side of the cylinder head. Such one leg is used for supporting control mechanism for the second control valve assembly for eliminating a separate support frame.

In one aspect of the present invention, the second control valve assembly is arranged so that it comprises a forwardly opening inlet port, rearwardly opening fluid supply port for supplying fluid to the first control valve assembly, rearwardly opening fluid drainage port, and upwardly opening outlet ports. According to said arrangement, fluid is flowed through the second control valve assembly in one direction from the forwardmost inlet port via directional control valve or valves therein rearwardly into the cylinder head so that fluid passages to be provided in such valve assembly may be formed with ease. The rearwardly opening fluid supply port and fluid drainage port may be communicated directly to fluid passages in the cylinder head. The upwardly opening outlet ports as well protected by the seat located above the valve assembly.

In a further aspect of the present invention, the second control valve assembly is divided into plural valve units, each including therein a directional control valve, and a cover formed with the inlet port referred to above. These valve units and cover are arranged and piled successively from the front end of cylinder head forwardly and are fastened together to the cylinder head. According to this aspect, number of directional control valves to be provided in correspondence with number of working implements may be varied simply by enlarging or reducing the number of valve units without providing any change to the other parts.

In another aspect of the present invention, a cover formed with forwardly opening inlet port and fluid pressure-supply port is provided at the front end of the second control valve assembly. Such cover is further fashioned such that it includes therein a flow divider for dividing fluid flowing in the inlet port into two parts, one of which is supplied to directional control valves in the second control valve assembly and the other which is supplied to the fluid pressure-supply port. The flow divider and fluid pressure-supply port will permit to take from the same system a fluid pressure for another purpose, such as for operating a power cylinder in a power steering mechanism or for actuating fluid-operated clutch means in the transmission, so that the fluid supply mechanism in a working vehicle may be simplified.

BRIEF DESCRIPTION OF THE DRAWINGS

In the drawings:

FIG. 5 is an enlarged sectional side view taken along line V—V of FIG. 3;

FIG. 10 is a sectional front view taken along line X—X of FIG. 3;

FIG. 11 is a sectional side view taken along line XI—XI of FIG. 10;

FIG. 12 is a sectional plan view taken along line XII—XII of FIG. 5;

FIG. 13 is a sectional rear view taken along line XIII—XIII of FIG. 12;

FIG. 14 is a sectional front view taken along line XIV—XIV of FIG. 12;

FIG. 15 is a front view seen along arrows XV—XV of FIG. 4;

FIG. 16 is a side view showing a part of the control mechanism shown in FIG. 4;

FIG. 17 is a plan view showing a part of the control mechanism shown in FIG. 16;

FIG. 18 is a perspective view showing a part of the control mechanism shown in FIG. 16;

FIG. 19 is a side view of a part of a working vehicle in which another embodiment of the present invention is employed;

FIG. 20 is a plan view of cylinder head shown in FIG. 19, showing further in section stop valve and handling means therefor employed in the another embodiment;

FIG. 21 is a front view of second control valve assembly shown in FIG. 19, showing further control mechanism for such valve assembly;

FIG. 22 is a side view of the second control valve assembly and control mechanism therefor shown in FIG. 21; and FIGS. 23 and 24 are perspective views of structural components of the control mechanism shown in FIGS. 21 and 22 and arrangement of such components, respectively.

DESCRIPTION OF A PREFERRED EMBODIMENT

Vehicle Structure

Figure 1:
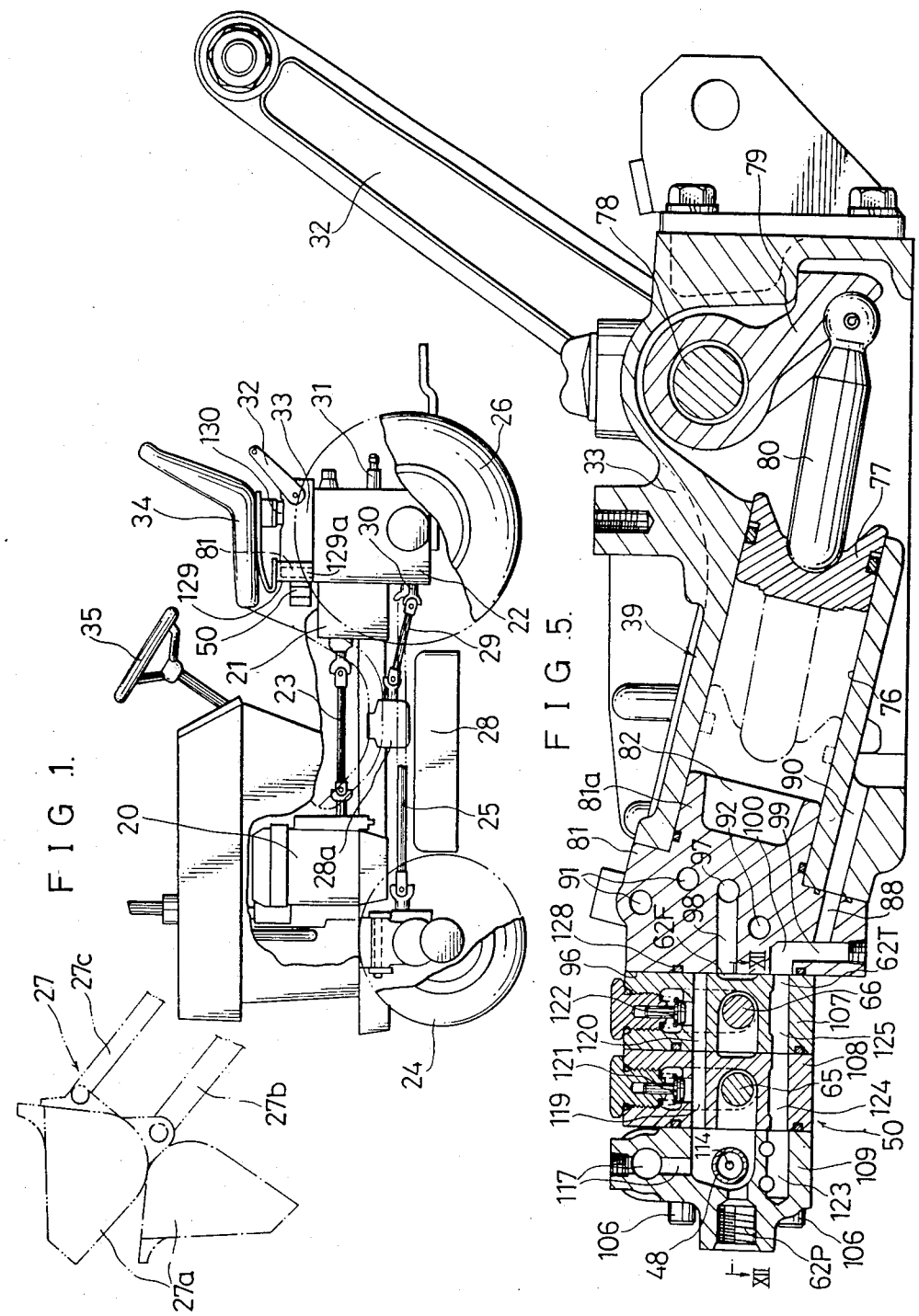
FIG. 1 is a schematic side view, partially cut away, of a working vehicle in which an embodiment of the present invention is employed.

FIG. 1 shows schematically a working vehicle which is a relatively small tractor and in which a preferred embodiment of the fluid supply system according to the present invention is employed.

As shown in FIG. 1, an engine 20 is mounted on the front of vehicle. On the rear of the vehicle are mounted a hydrostatic transmission 21 and a transmission case 22 which are in an overlapped relationship with each other in the longitudinal direction of the vehicle. A transmission shaft 23 is provided for transmitting power from engine 20 to the hydrostatic transmission 21 and another transmission shaft 25 is provided for transmitting power from the inside of the transmission case 22 toward front wheels 24. The vehicle is moved by driving rear wheels 26 and, when required, front wheels 24 with a variable speed which may be controlled by the hydrostatic transmission 21 and transmission mechanism in the case 22.

The vehicle shown is fashioned such that it may be equipped with a front loader 27 shown in phantom in FIG. 1 at the front of the vehicle, a mower 28 shown in FIG. 1 at a middle of and below the vehicle, and another working implements such as rotary tiller, grass collector and the like at the rear of the vehicle. For operating the front loader 27, a hydralic mechanism is provided which will be described later. For driving the mower 28, a mid PTO shaft 30 is provided which extends forwardly from the inside of transmission case 22 and is connected drivably to a gear box 28a for driving mower 28 through a transmission shaft 29. For driving a working implement drawn by the vehicle, a rear PTO shaft 31 is provided which extends rearwardly from the inside of the case 22.

On the top of transmission case 22 is mounted a hydraulic lift mechanism having left and right lift arms 32 for lifting and lowering a working implement drawn by the vehicle. A seat 34 is located above a cylinder case 33 of the hydraulic lift mechanism and a steering wheel 35 is located before the seat. The vehicle is steered by handling the steering wheel 35 so as to turn the front wheels 24 through a power steering mechanism which will be described later.

Hydraulic Circuit

Figure 2:
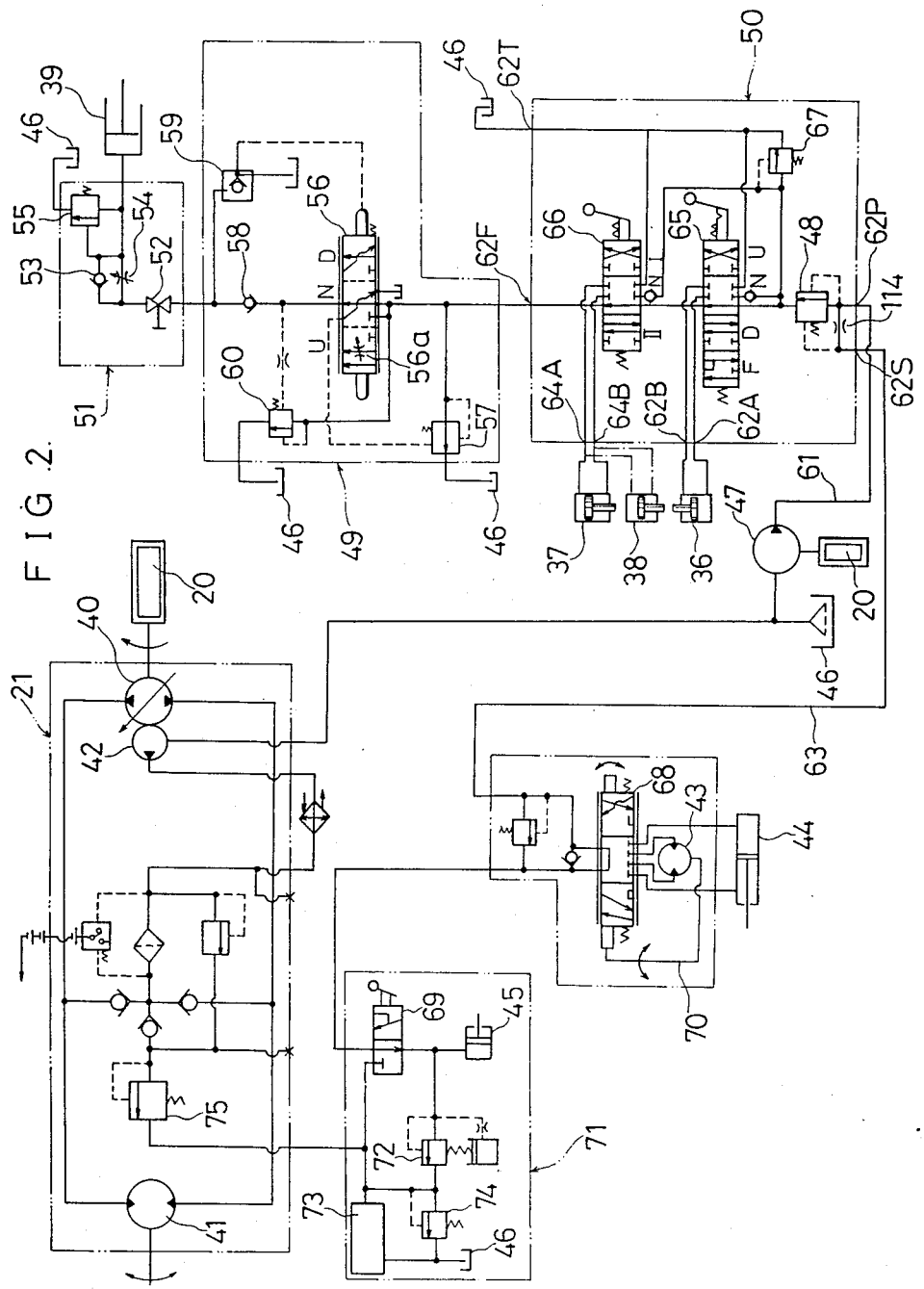
FIG. 2 is diagram showing fluid circuit of hydraulic mechanism employed in the vehicle shown in FIG. 1.

FIG. 2 illustrates hydraulic circuit provided in the vehicle shown in FIG. 1.

As hydraulic actuator means for operating the front loader 27 shown in FIG. 1, there are provided a lift cylinder 36 for lifting and lowering a bucket 27a by means of a pair of lift arms 27b (both shown in FIG. 1) and a tilt cylinder 37 for turning the bucket 27a through link means 27c (both shown in FIG. 1). Mower 27 shown in FIG. 1 is supported by the vehicle frame through a link mechanism (not shown) so that it may be displaced between a lower operative position and an upper nonoperative position by means of mower-lift cylinder 38 shown in FIG. 2. These hydraulic cylinders 36, 37 and 38 are structured as double-acting cylinders, as shown in FIG. 2.

As is conventional, the hydraulic lift mechanism comprises a single-acting hydraulic lift cylinder 39. As is also conventional, the hydrostatic transmission 21 comprises a hydraulic variable displacement pump 40 and a fixed displacement motor 41 which are connected with each other so that a closed circuit is formed. For supplementing fluid or oil to such closed circuit, a charge pump 42 is provided. Power steering mechanism for turning the front wheels comprises a metering motor 43 and a power cylinder 44. Pump shaft of the hydraulic pump 40 of the hydrostatic transmission 21 is used as an input shaft for PTO-transmission mechanism disposed within the transmission case 22. Such PTO-transmission mechanism includes a fluid-actuated clutch (not shown) for selectively disconnecting the PTO (power take-off) transmission line and numeral 45 in FIG. 2 designates an actuating cylinder for such clutch.

The transmission case 22 is also used as an oil reservoir or tank 46 shown in FIG. 2 for fluid or oil which is to be supplied to the various fluid-operated means referred to above. As shown in FIG. 2, a hydraulic pump 47 driven by the engine 20 is provided for supplying fluid from the tank 46. Outlet port of this pump 47 is connected to a flow divider 48 which divides fluid discharged from the pump 47 into two fluid lines. One of such divided lines is directed toward the lift cylinder 36, tilt cylinder 37, mower-lift cylinder 38 and hydraulic lift cylinder 39, whereas the other line is directed to the metering motor 43, power cylinder 44 and clutch-actuating cylinder 45. The charge pump 42 is provided independently of the fluid supply system referred to above and supplies fluid from the tank 46 to the closed circuit of hydrostatic transmission 21.

As also shown in FIG. 2, there are provided a first control valve assembly 49 for controlling supply of fluid to the hydraulic lift cylinder 39 and a second control valve assembly 50 for controlling supply of fluid to the lift cylinder 36, tilt cylinder 37 and mower-lift cylinder 38. These control valve assemblies 49 and 50 are connected in series with each other in a fashion such that the second control valve assembly 50 is located at the side of the flow divider 48 so that fluid is supplied toward the first control valve assembly 49 via the second control valve assembly 50. Between the first control valve assembly 49 and hydraulic lift cylinder 39 is disposed a final valve mechanism 51 which comprises a stop valve 52 for selectively stopping supply and drainage of fluid with respect to the hydraulic lift cylinder 39 by closing selectively fluid path communicated with such cylinder 39, slow-return valve means including a check valve 53 for a quick supply of fluid to the lift cylinder 39 and an adjustable area throttle 54 connected in parallel with the check valve 53 for a slow drainage of fluid from the lift cylinder 39, and overload-relief valve 55 for avoiding application of an excessive fluid pressure to the lift cylinder 39.

Conventionally, the first control valve assembly 49 includes a directional control valve 56 for controlling supply and drainage of fluid with respect to the hydraulic lift cylinder 39, unloader valve 57 for unloading fluid supplied under pressure from the hydraulic pump 47 with a low pressure at neutral position N and implement-lowering position D of the control valve 56, nonreturn check valve 58 for preventing return of fluid from the lift cylinder 39 at neutral position N and lowering position D of the control valve 56, and unloader check valve 59 which, when the control valve 56 is displaced to lowering position D, is displaced together to its open position so as to permit drainage of fluid from the lift cylinder 39. In the valve assembly 49 shown, a relief valve 60 is provided to which fluid pressure in the outlet line of control valve 56 is applied as back pressure so that it regulates the flow rate of fluid supplied to the hydraulic lift cylinder 39 at implement-lifting position U of the control valve 56 in cooperation with a variable area throttle 56a which is incorporated in such control valve 56 so as to be inserted in the fluid supply passage when the valve 56 is displaced to lifting position U.

The second control valve assembly 50 comprises eight ports, namely an inlet port 62P connected to a circuit 61 coming from the hydraulic pump 47, fluid pressure-supply port 62S to be connected with a circuit 63 for supplying fluid pressure toward the power steering mechanism, fluid supply port 62F connected with the first control valve assembly 49, fluid drainage port 62T to be connected with oil tank 46, and two pairs of outlet ports 62A, 62B and 64A, 64B. The flow divider 48 referred to before is disposed within this second control valve assembly 50. Second control valve assembly 50 comprises two directional control valves 65, 66 which are connected in series with each other. The control valve 65 located at the side of flow divider 65 controls supply and drainage of fluid with respect to the outlet ports 62A and 62B, whereas the control valve 66 controls supply and drainage of fluid with respect to the outlet ports 64A and 64B. It is designed that tilt cylinder 37 and mover-lift cylinder 38 referred to before are connected selectively to the outlet ports 64A and 64B so that one of such cylinders 37, 38 is used selectively under a control by means of the control valve 66. Each of the control valves 65 and 66 is fashioned such that it permits flow of fluid toward the fluid supply port 62F at its neutral position N where each of such control valves blocks the outlet ports 62A, 62B or 64A, 64B associated therewith. Control valve 65 comprises neutral position N referred to above, lifting position U where it operates to extend the lift cylinder 36, lowering position D where it operates to contract the cylinder 36, and floating position F where it drains fluid from both of the fluid chambers in the cylinder 36 so that the lift arm 27b and bucket 27a shown in FIG. 1 are in a floating state at their lowered condition. The other control valve 66 comprises neutral position N referred to above, an operative position I where it operates to extend tilt cylinder 37 or mower-lift cylinder 38, and another operative position II where it operates to contract such cylinder 37 or 38. Relief valve 67 for determining fluid pressure selectively applied to each of the cylinders 36, 37 and 38 and to the hydraulic lift cylinder 39 is provided within the second control valve assembly 50. The downstream side of such relief valve 67 is connected to the fluid drainage port 62T.

In FIG. 2, numeral 68 designates a directional control valve for the metering motor 43 and power cylinder 44 and numeral 69 designates a directional control valve for the actuating cylinder 45. The former control valve 68 which is displaced by means of steering wheel 35 shown in FIG. 1 is structured as a servo valve which is returned to its neutral position by the metering motor 43 via feedback means 70. Control valve mechanism 71 including the control valve 69 further comprises relief valve 72 of a pressure-modulating type for the actuating cylinder 45 and secondary relief valve 74 for establishing pressure of fluid supplied to portions 73 to be lubricated as lubricant. It is designed that fluid released from a relief valve 75 in the hydrostatic transmission 21 is also supplied to the portions 73 as lubricant.

Hydraulic Lift Mechanism

As shown in FIG. 1 and FIGS. 3 to 5, the cylinder case 33 of the hydraulic lift mechanism is mounted on the upper surface of transmission case 22 and supports at a rear end portion thereof the left and right lift arms 32 rotatably. As shown in FIG. 5, the cylinder case 33 is formed therein with a cylider bore 76 which is inclined slightly toward a backward and downward direction. In the cylinder bore 76 is slidably fitted a piston 77 so as to provide the lift cylinder 39. The cylinder case 33 journals a lift arm shaft 78 to which the pair of lift arms 32 are fixedly secured at the outside of the case 33. Between an operating arm 79, located within the case 33 and secured to the shaft 70, and piston 77 is disposed a connecting rod 80 so that lift arms 32 are revolved upwardly by an extending operation of hydraulic lift cylinder 39. As is conventional, front end opening of the cylinder bore 76 is closed by means of cylinder head 81 so as to define an operating fluid chamber 82 of the lift cylinder 39 within the case 33.

Cylinder Head

Structure of the cylinder head 81 will be described by referring to FIGS. 5 to 9.

Figure 9:
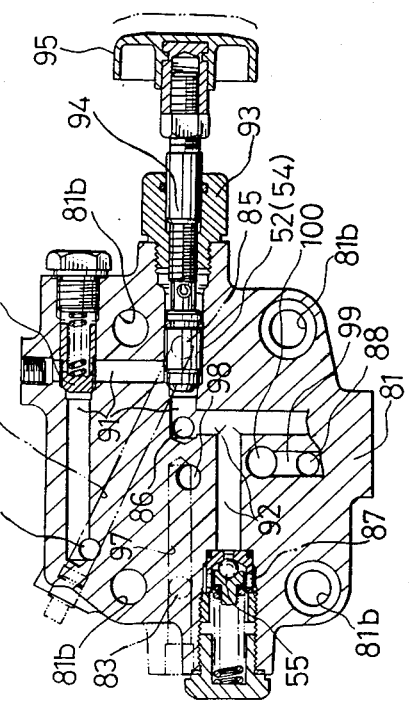
FIG. 9 is a sectional front view of the cylinder head shown in FIG. 6, showing further various valves disposed in such cylinder head.
Figure 8:
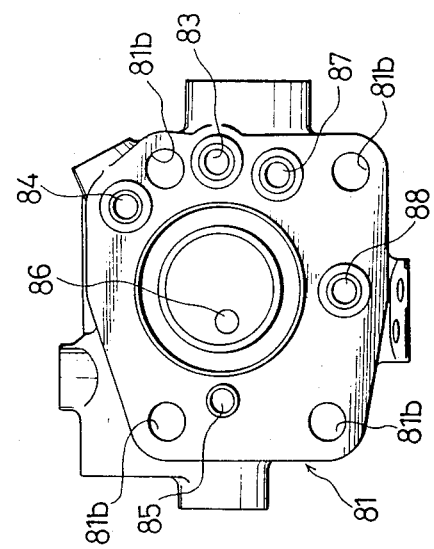
FIG. 8 is a rear view of the cylinder head shown in FIG. 6.

This cylinder head 81 comprises at its rear end a circular portion 81a to be fitted in the cylinder bore 76 and is fixedly secured to the cylinder case 33 with an inclined posture corresponding to that of lift cylinder 39 by means of fastening bolts through bolt-inserting bores 81b. Cylinder head 81 includes therein along its axial direction fluid passage 83 directed toward the first control valve assembly 49 referred to previously with reference to FIG. 2, fluid passages 84 and 85 directed from such valve assembly 49, fluid passage 86 directed to the operating fluid chamber 82 of hydraulic lift cylinder 39, and fluid passages 87 and 88 directed toward the inside of transmission case 22 or oil tank. These fluid passages 83 to 88 are formed such that they open at the rear end face of cylinder head 81, as shown in FIG. 8. As shown in FIG. 9, fluid passages 84 and 85 are communicated with each other by an inclined fluid passage 89 formed in the head 81. Fluid passage 88 is communicated via a fluid passage (not shown) in the cylinder case 33 and fluid passage 88 is communicated via a fluid passage 90 (FIG. 5) respectively to a top opening of the transmission case 22 and then to the inside to such case.

As shown in FIG. 9, fluid passage 84 directed from the first control valve assembly 49 is communicated with fluid passage 86 opening at the operating fluid chamber 82 by means of bent fluid passage 91 within the head 81. The check valve 53 and stop valve 52 described before by referring to FIG. 2 are disposed respectively within cylinder head 81 at one and another corners of such bent fluid passage 91 Stop valve 52 shown is fashioned such that when displaced axially by a manual control it may block the passage 91 and also may throttle flow area of such passage variably. The stop valve 52 thus functions also as the adjustable area throttle 54 shown in FIG. 2. Fluid passage 86, opening at the operating fluid chamber 82, is also communicated within the head 81 with fluid passage 87 for returning fluid into transmission case 22 by means of fluid passage 92 in which the overload-relief valve 55 referred to previously with reference to FIG. 2 is incorporated.

As also shown in FIG. 9, the stop valve 52 is particularly fashioned such that it is handled so as to be displaced along a direction across the cylinder head 81. For handling such valve 52, and operating rod 94 is provided which is threadingly engaged with a nut member 93, secured to the head 81 at one side of such head, and is rigidly connected to the valve 52. This operating rod 94 has at its outer end a handle 95 attached thereto so that when the handle 95 is rotated the operating rod 94 is rotated so as to vary its position along the axial direction thereof. Position of the stop valve 52 may thus be varied or adjusted by means of handle 95.

Figure 7:
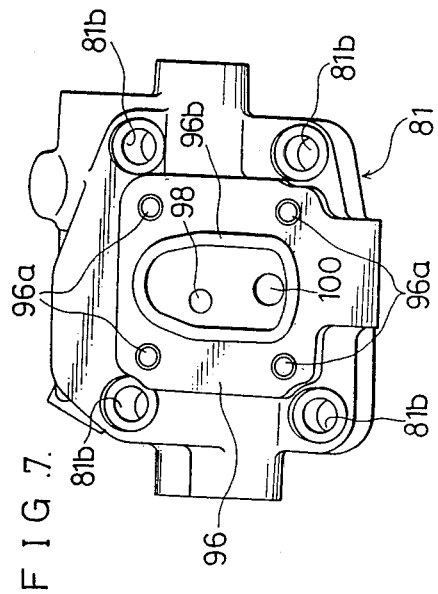
FIG. 7 is a front view of the cylinder head shown in FIG. 6.
Figure 6:
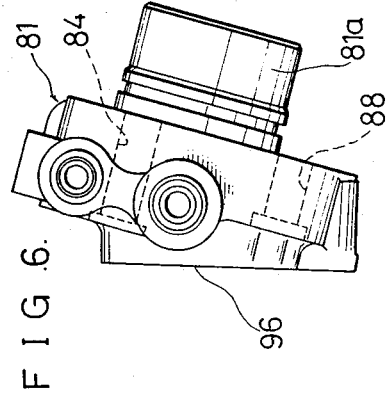
FIG. 6 is a side view of cylinder head of the hydraulic lift mechanism shown in FIGS. 3 to 5.

As clearly seen from FIGS. 5 to 7, a vertical seating surface 96 is formed to the front of cylinder head 81 which takes an inclined posture corresponding to that of hydraulic lift cylinder 39. As shown in FIG. 7, the seating surface 96 is formed with threaded bores 96a for fastening bolts and an endless groove 96a for sealing ring. The fluid passage 83 directed toward the first control valve assembly 49 is communicated to the position of such seating surface 96 through a lateral fluid passage 97 and axial fluid passage 98 which are formed within cylinder head 81 so that the latter passage 98 opens at the seating surface 96. The fluid passage 88 directed toward the inside of transmission case 22 is communicated to the position of seating surface 96 through a vertical passage 99 and axial passage 100 which are formed within the head 81 so that the latter passage 100 opens at the seating surface 96.

Arrangement of Control Valve Assemblies

Figure 3:
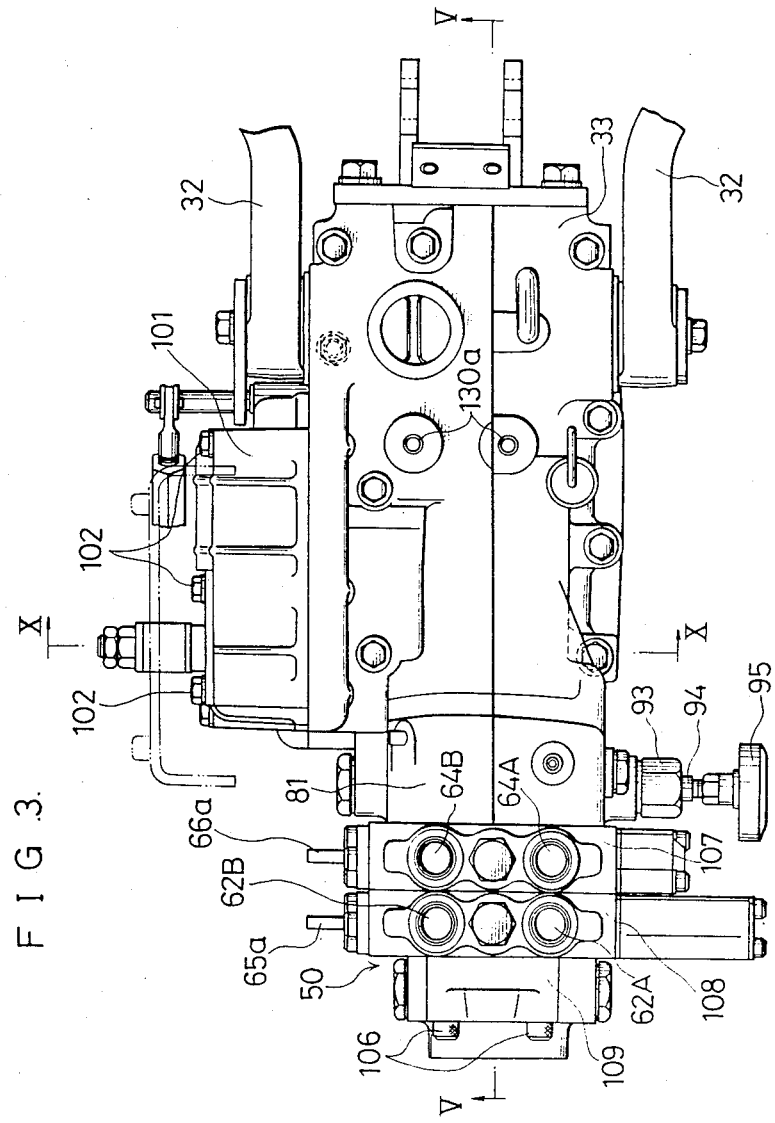
FIG. 3 is a plan view showing hydraulic lift mechanism and control valve assemblies employed in the vehicle shown in FIG. 1.
Figure 4:
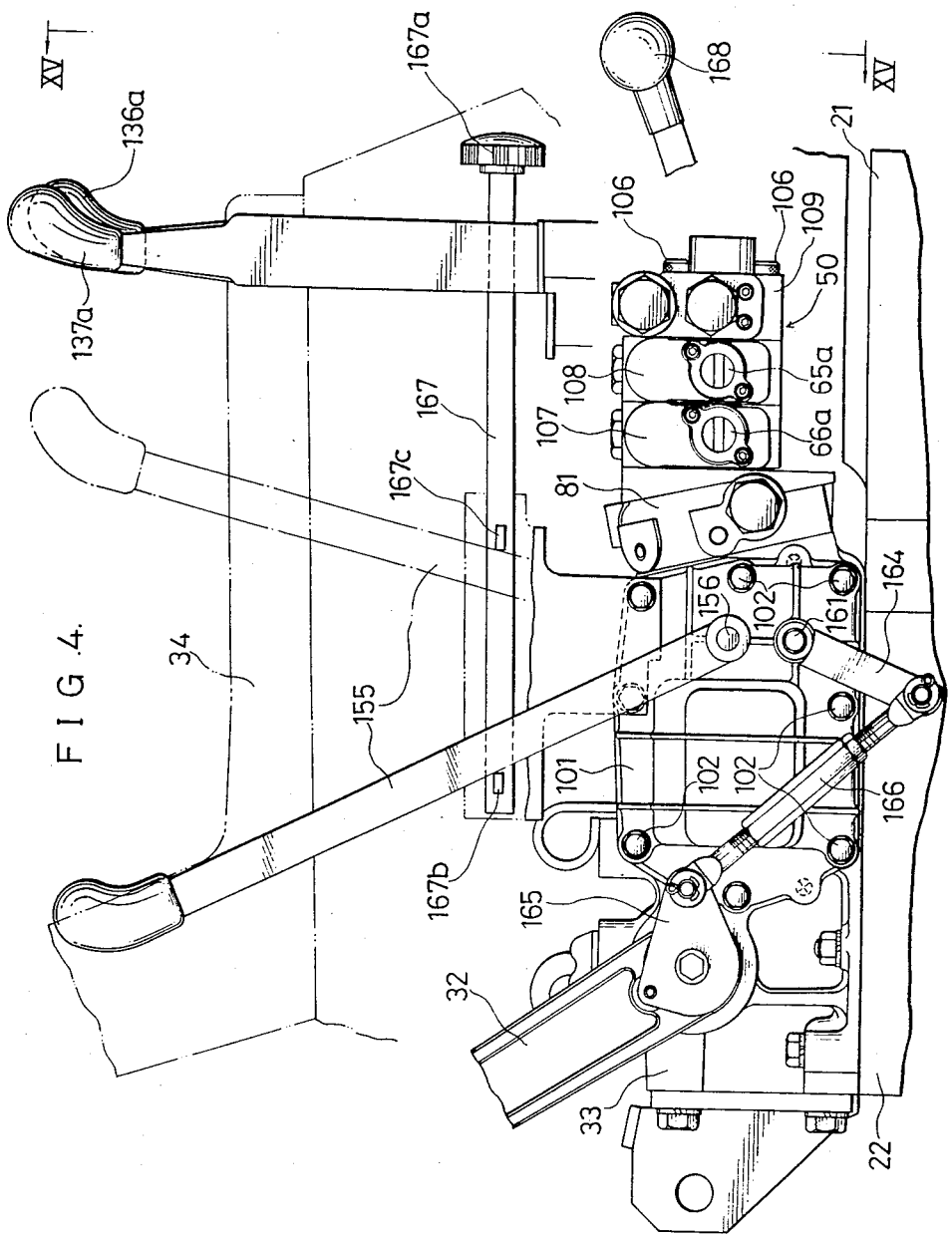
FIG. 4 is a side view showing the hydraulic lift mechanism and one of the control valve assemblies shown in FIG. 3 with a part of control mechanism therefor.

As shown in FIGS. 3 and 4, cover 101 in the shape of a casing is attached to a side wall of the cylinder case 33 located opposite to the handle 95 by using bolts 102. As shown in FIGS. 10 and 11, the first control valve assembly 49 referred to before with reference to FIG. 2 is arranged within the cover 101 by securing such assembly to a side wall of the cylinder case 33 by means of fastening bolts 103. The directional control valve 56 referred to before with reference to FIG. 2 is provided by a spool projected forwardly from the valve case of control valve assembly 49. As shown in FIG. 10, cylinder head 81 is formed with a fluid passage 104 for communicating the fluid passage 83 (FIGS. 8 and 9) in the cylinder head 81 to the inside of control valve assembly 49 and another fluid passage 105 for communicating the inside of control valve assembly 49 to the fluid passage 84 (FIGS. 6, 8 and 9) in the cylinder head 81.

As clearly shown in FIGS. 3 to 5, the second control valve assembly 50 described before by referring to FIG. 2 is particularly mounted on the front of cylinder head 81 fixedly by using the vertical seating surface 96 and by means of fastening bolts 106.

Second Control Valve Assembly

Structure of the second control valve assembly 50 will be described by referring to FIG. 5 and FIGS. 12 to 14.

This second control valve assembly 50 is structured as so-called "stack valve" in which valve unit 107 including the aforesaid directional control valve 66, valve unit 108 including the aforesaid directional control valve 65, and cover 109 including the aforesaid flow divider 48 and relief valve 67 are arranged and piled successively, in that order, from the front end of cylinder head 81 forwardly in a fashion such that spools constituting the control valves 65 and 66 extend along a lateral direction. With the ports described before by referring to FIG. 2, the inlet port 62P and fluid pressure-supply port 62S are formed respectively to the cover 109 so that each of these ports opens forwardly whereas the fluid supply port 62F and fluid drainage port 62T are formed respectively to the valve unit 107 so that each of these ports opens rearwardly. As shown in FIG. 5, the latter two ports 62F and 62T are disposed so that they are aligned and communicated respectively with the aforesaid fluid passages 98 and 100 in the cylinder head 81. As shown in FIGS. 12 and 13 and as clearly shown in FIG. 3, the outlet ports 62A, 62B and 64A, 64B are formed respectively to the valve units 108 and 107 so that each of these outlet ports opens upwardly.

The flow divider 48 is disposed within the cover 109 slidably along a lateral direction. This divider 48 includes therein an axially extending center bore and is formed intermittently along its axis with a plural sets of radially extending perforations 110, 112 and 113, namely perforations 110 for communicating the center bore with the inlet port 62, perforations 112 for communicating the center bore with a fluid passage 111 directed toward the control valves 65, 66 and fluid supply port 62F, and perforations for communicating the center bore with the fluid pressure-supply port 62S. A throttle 114 is provided within the center bore at a position between the perforations 112 and 113. Within the center bore is disposed a compression spring 115 which biases the flow divider 48 to move toward a direction such that communicating area between perforations 112 and fluid passage 111 is narrowed by the divider 48. Fluid pressure in the inlet port 62P is applied to such divider 48 against the biasing of spring 115 through a throttle 116. It is thus seen that the flow divider 48 is biased upwardly, as viewed in FIG. 12, by spring 115 and also by fluid pressure in the downstream of throttle 114 and downwardly, as viewed in FIG. 12, by fluid pressure in the inlet port 62P which is applied through throttle 116. Consequently, the divider 48 will take a position where biasing force applied to such divider from one direction is balanced with biasing force applied to the divider from another direction opposite to the former direction. Ratio of communicating area between perforations 112 and fluid passasage 111 to communicating area between perforations 113 and fluid pressure-supply port 62S is determined by such position of flow divider 48 and is varied when fluid pressure in the inlet port 62P is varied resulting in a variation in position of the divider 48. It is thus seen that flow divider 48 will divide fluid flowing in inlet port 62P into two divided flows, one being directed toward the control valves 65, 66 and fluid supply port 62F and the other being directed toward fluid pressure-supply port 62S, in a manner such that when fluid pressure in the inlet port 62P is lowered the divider 48 is displaced upwardly, as viewed in FIG. 12, so as to increase flow rate directed toward the fluid pressure-supply port 62S, whereby flow rate obtained in such port 62S is kept constant. The flow divider 48 shown is further fashioned such that when displaced to the uppermost position, as viewed in FIG. 12, it will interrupt fluid communication between the perforations 112 and fluid passage 111, as shown in FIG. 12, to stop supply of fluid toward the control valves 65, 66 and fluid supply port 62F.

It is thus seen that the flow divider 48 is provided so as to make the aforesaid circuit 63 directed toward the power steering mechanism a priority circuit in a manner such that even when speed of rotation of the pump 47 shown in FIG. 2 is lowered due to an increase in load or the like a constant flow rate or at least some flow is secured in the fluid pressure-supply port 62S. By this, a dangerous condition wherein the vehicle cannot be steered properly is averted.

As shown in FIG. 13, the aforesaid relief valve 67 is disposed in a fluid passage 117 which is formed within the cover 109 so as to be communicated with the aforesaid fluid passage 111 directed toward the control valves 65, 66 and fluid supply port 62F. At the downstream side of such relief valve is provided a fluid passage 118 which is communicated to the fluid drainage port 62T.

Within the valve units 108 and 107 are provided respectively fluid passages 119 and 120 which are communicated with the fluid passage 111 in the cover 109. As shown in FIG. 14 with respect to passage 120, each of these fluid passages 119 and 120 includes therein a check valve 121 or 122 for preventing an adverse flow and in formed so that it opens at the circumference of directional control valve or spool 65 or 66 at two positions spaced from each other in the axial direction of such spool. As shown in FIG. 5, the cover 109 and valve units 108 and 107 are formed therein with aligned fluid passages 123, 124 and 125 which are communicated with fluid drainage port 62T. As shown in FIG. 14 with respect to passage 125, each of the fluid passages 124 and 125 in the valve units 108 and 107 is formed so that it opens at the circumference of spool 65 or 66 at two positions spaced from each other in the axial direction of such spool. Each of the pair of outlet ports 62A, 62B and 64A, 64B of the valve units 108 and 107 are also formed so that they open at the circumference of spool 65 or 66 at two positions spaced from each other in the axial direction of such spool, as shown in FIG. 14 with respect to ports 64A and 64B.

Each of the directional control valves or spools 65 and 66 is formed with a plurality of lands which act to connect and disconnect the fluid passages opening at the circumference of such spool in response to the position of spool so that control of supply and drainage of fluid is achieved in the manner having been detailed before by referring to FIG. 2. Fluid passage 111 in the cover 109 which passage is supplied with fluid from the inlet port 62P through flow divider 48 acts to supply fluid to the control valves 65 and 66 when such valves are in operative positions. As shown in FIG. 12, such fluid passage 111 is communicated, when both of the control valves 65 and 66 are in neutral positions, to the fluid supply port 62F through the fluid passages 119 and 120 in the valve units 108 and 107.

As shown in FIGS. 3 and 12, one ends 65a, 66a of the spools 65, 66 at which the spools are maneuvered or controlled are projected outwardly from the valve assembly 50 at a side opposite to the aforesaid handle 95 for stop valve 95. As shown in FIG. 12, the other ends of spools 65 and 66 are associated with return spring means 126 and 127 for returning the spools to neutral positions automatically when manual force applied to such spools for moving same is released. The aforesaid endless groove 96b shown in FIG. 8 is used for receiving a seal ring 128 disposed between the cylinder head 81 and second control valve assembly 50, as shown in FIG. 5.

The second control valve assembly having been detailed hereinbefore is located below the fronter half of the seat 34, as shown in FIG. 4, and is spaced from the bottom of such seat 34 by a relatively large interval, as shown in FIGS. 4 and 15.

Control Mechanism for valves

As shown in FIG. 1, the seat 34 is supported at its front end portion by an arch-shaped frame 129, fixedly arranged on a front end portion of the upper surface of transmission case 22, and at its rear end portion by another arch-shaped frame 130 which is fixedly secured to the upper surface of cylinder case 33 using threaded bores 130a shown in FIG. 3. Control mechanism for the second control valve assembly 50 is provided using one of the legs 129a of the former frame 129 as a support therefor in a fashion which will be detailed hereinafter.

Such legs 129a are located as viewed in the longitudinal direction of vehicle near the cylinder head 81, as can be seen from FIG. 1. As shown in FIGS. 15 and 16, a horizontal support plate 131 is provided which is secured to the inner surface of one of the legs 129a and is projected forwardly and inwardly. To this support plate 131 is fixedly secured by welding a pair of vertical sleeves 132 and 133 which receive rotatably a pair of shafts 134 and 135. A control lever 136 for displacing the control valve 65 is attached at its lower end to the top of shaft 134 and is projected outwardly and upwardly so that it is located at a side of the seat 34. A control lever 137 for diplacing the control valve 66 is attached at its lower end to the top of shaft 135 and is similarly projected outwardly and upwardly so that it is located at a side of the seat 34. Each of these control levers 136 and 137 has a grip 136a or 137a at the top end thereof.

To the lower end of each of the shafts 134 and 135 is secured a horizontal arm 138 or 139. Between the ends 65a, 66a of control valves 65, 66 and arms 138, 139 are disposed connecting rods 140 and 141 each of which has forked ends, as clearly shown in FIG. 18 with respect to rod 140. The end 65a of control valve or spool 65 is operatively connected to the arm 138 by means of connecting rod 140 and vertical pins 142 and 143 which connect the forked ends of rod 140 to the arm 138 and spool 65, respectively. The end 66a of control valve or spool 66 is similarly connected to the arm 139 by means of connecting rod 141 and vertical pins 144 and 145.

It is thus seen that when operator on the seat 34 moves the control lever 136 or 137 along the forward and backward direction the control valve 65 or 66 is displaced along the left and right direction through shaft 134 or 135, arm 138 or 139 and connecting rod 140 or 141. As shown in FIGS. 15 and 14, each of the valve units 108 and 107 is provided on its outer surface with a bracket 146, 147 adjacent to the end 65a, 66a of each control valve 65, 66. Such brackets 146 and 147 may be used for supporting control levers when each of the valves 65 and 66 is employed for an independent use.

The operating rod 94 for stop valve 52 extends through the leg 129a of the other side.

Control mechanism for the first control valve assembly 49 comprises a control level 155 which is located behind the control levers 136 and 137 and extends upwardly at a side of the seat 34. As shown in FIG. 10, the aforesaid cover 101 supports a rotatable control shaft 156 to which the control lever 155 having a top end grip 155a is secured at its lower end. Within the cover 101 is provided a control link 158 with which the directional control valve or spool 56 is engaged by the biasing force of spring 157 for biasing the spol 56 outwardly from valve case for the valve assembly 49. To the inner end of control shaft 156 is secured an arm 159 having at its free end a horizontal pin 160 which is inserted into an elongated aperture 158a formed to the top end of control link 158. The cover 104 also supports another control shaft 161 which is in parallel with the control shaft 156. To the inner end of this another control shaft 161 is secured an arm 162 having at its free end a horizontal pin 163 which is connected rotatably to the lower end of control link 158. To the outer end of control shaft 161 is attached a feedback link 164 which is connected, as shown in FIG. 4, to a rotatable plate member 165, fixed to one of the lift arms 32 so as to be rotated by such lift arm, by means of connecting rod 166.

When the control lever 155 is moved or revolved by operator on the seat 34 along the forward and backward direction, the control link 158 is revolved around the lower pin 163 through the control shaft 156, arm 157 and upper pin 160 so that the control valve 56 is displaced from its neutral position N to the aforesaid operative position U or D resulting in upward or downward revolving movement of lift arms 32. Such movement of lift arms 32 is transmitted to the control link 158 through the rotatable plate member 165, connecting rod 166, feedback link 164, control shaft 161, arm 162 and lower pin 163 to cause a revolving movement of control link 158 about the upper pin 160 toward a direction opposite to the direction of revolving movement having been provided by the operation of control lever 155. By this, the control valve 56 is returned automatically to its neutral position. Range of operation of the control lever 155 is adjustably limited by a limit mechanism shown in FIG. 4 which comprises an adjusting rod 167 having at its front end a handle 167a for displacing the rod 167 in the axial direction of such rod. The adjusting rod 167 further has thereon a pair of stopps 167b and 167c for limiting range of operation of the lever 155. Positions of these stopps 167b, 167c may be changed by a displacement of the rod 167 using the handle 167a.

In FIGS. 15 and 16, numeral 168 designates a speed change lever which is located at a side of the seat 34 where the control levers 136, 137 and 155 are located and which is used for controlling speed change ratio of an auxiliary speed change mechanism (not shown) provided within transmission case for step change of vehicle speed. In FIG. 15, numeral 169 designates a clutch lever used for operating a front wheel-driving clutch (not shown) which is provided within transmission case 22 for selectively driving the transmission shaft 25 shown in FIG. 1, In FIG. 10, numeral 170 designates an oil-level stick which is supported by the cylinder case 33 and is projected into transmission case 22 for detecting the level of oil within the case 22.

Operation

When the vehicle shown is used for loading operation by the front loader 27 shown in FIG. 1, outlet ports 62A and 62B of the second control valve assembly 50 are connected to the lift cylinder 36 shown in FIG. 2 by means of hydraulic piping and outlet ports 64A and 64B of the valve assembly 50 are connected to the tilt cylinder 37 shown in FIG. 2 by means of hydraulic piping. During such loading operation bucket 27a is selectively lifted and lowered by a selective operation of the lift cylinder 36 which is actuated by a selective displacement of control valve 65 by means of control lever 136, whereas such bucket 27a is selectively turned or tilted by a selective operation of the tilt cylinder 37 which is actuated by a selective displacement of control valve 66 by means of control lever 137. When the mowing operation by the mower 28 shown in FIG. 1 is performed, outlet ports 64A and 64B of the second control valve assembly 50 are connected to the mower-lift cylinder 38 shown in FIG. 2. During such mowing operation the control valve 66 is selectively displaced by means of control lever 137 so as to achieve a seletive lifting and lowering or mower 28 by the mower-lift cylinder 38, while the control valve 65 is kept in its neutral position. Such lifting and lowering of mower 28 are made for the purpose, by way of example, of adjusting the cutting level of such mower or of lifting such mower to a non-operative position when the vehicle is turned. Because there is secured a relatively large interval between upwardly opening outlet ports 62A, 62B, 64A and 64B and the bottom surface of seat 34, piping operation with respect to the outlet ports as well as closing of such outlet ports which is done using threaded plugs when required may be carried out with ease. Oil drained from the second control valve assembly 50 is returned from the fluid drainage port 62T of such assembly into the transmission case 22 through fluid passages 100, 99 and 88 in the cylinder head 81 and through fluid passage 90 in the cylinder case 33.

When the vehicle shown is used for earth-moving or another purposes carried out by a working implement such as rotary tiller which is connected to the rear of vehicle by means of pivotable coupling means such as three-point linkage, lift arms 32 of the hydraulic lift mechanism are connected to such coupling means. The directional control valve 56 is the first control valve assembly 49 is selectively displaced by means of control lever 155 for lifting and lowering selectively the working implement while the control valves 65 and 66 in the second control valve assembly 50 are kept in their neutral positions. Such lifting and lowering of the implement are made for the purpose, by way of example, of adjusting the depth of earth to be tilled by a rotary tiller or of lifting such tiller to a non-operative position when the vehicle is turned. The feedback mechanism referred to before with reference to FIGS. 10 and 4 will stop a lifting or lowering movement of working implement automatically when such implement has been lifted or lowered by a distance corresponding to the amount of revolution having been given to the level 155 by a manual operation. Supply of fluid from the second control valve assembly 50 to the first control valve assembly 49 is achieved through the fluid supply port 62F of second control valve assembly 50, fluid passages 98, 97 and 83 in the cylinder head 81 and fluid passage 104 in the cylinder case 33.

During such working operations, a selective steering of the vehicle by means of power steering mechanism 43, 44 as well as a selective engagement of the fluid-actuated clutch incorporated in PTO transmission line by means of actuating cylinder 45 may be achieved without any trouble owing to the provision of flow divider 48 which divides flow of fluid from the pump 47 into two parts.

The second control valve assembly 50 may be mounted on the front of cylinder head 81 with ease because there is a large open space before such cylinder head 81. Control mechanism 134 to 141 for such second control valve assembly 50 may also be equipped with ease owing to the arrangement of handling mechanism 94, 95 for the stop valve 52 at the side opposite to the control mechanism 134 to 141. The second control valve assembly 50 which is structured at "stack valve" will allow, when required, to remove any one of the valve units 107 or 108 or to provide further one or more additional valve units while the cover 109 including the flow divider 48 and relief valve 67 is left as it is.

The cylinder head 81 is effectively utilized not only for the purpose of equipping therein the final valve mechanism 51 shown in FIG. 2 but for the purpose of providing therein passages for fluid supplied from the second control valve assembly 50 to the first control valve assembly 49 and passages for fluid drained from the second control valve assembly 50 into transmission case 22 which reserves oil.

DESCRIPTION OF ANOTHER PREFERRED EMBODIMENT

In FIGS. 19 to 24, there is shown another preferred embodiment in which handling mechanism for the stop valve 50 and control mechanism for the second control valve assembly are modified.

As shown in FIGS. 19 and 20, a handle 295 for displacing the stop valve 50 which also acts as the throttle 54 is arranged differently from the aforesaid handle 95 in a fashion such that it is located at a side of the cylinder case 33 and is directed approximately backwardly. Such arrangement permits varying the position of handle 295 relative to the position of stop valve 52 so that the handle 295 may be arranged at an optimum location where it does not interfere with other structural members and where it may be operated by operator on the seat 34 with ease.

For permitting such arrangement of handle, a retainer pipe 201 is fixedly secured to the cylinder head 81. This pipe 201 is shaped so that it extends from the outside of stop valve 91 approximately toward a backward direction. To the rear end of pipe 201 is fixedly secured a holder sleeve 201a having a threadingly fitted nut member 202 with which an operating rod 203 carrying the handle 295 is in turn threadably engaged. Within the retainer pipe 201 are disposed a row of balls 204 between the outer end of stop valve 52 and the inner end of operating rod 203. On the operating rod 203 is slidably mounted a stopper ring 206 which abuts, when the handle 295 is fully rotated toward the direction of moving the rod 203 backwardly, against the inner face of nut 202 by being pushed by means of pin 205 fixed to the rod 203. The operating rod 203 is thus prevented from getting out of the nut 202.

When the handle 295 is rotated toward a direction so as to move the rod 203 backwardly or outwardly, the row of balls 204 may be moved by a distance corresponding to that of the backward movement of operating rod 203 so that fluid pressure in the passage 91 moves the stop valve 52 to displace toward the balls 204 resulting in an opening of the fluid passage 91. Conversely, when the handle 295 is rotated toward another direction so as to move the rod 203 forwardly or inwardly, the stop valve 52 is pushed via the row of balls 204 to a position where the valve 52 throttles the fluid passage 91 and, then, to a position where the valve 52 blocks such passage 91. Stop valve for hydraulic lift mechanism which is operated by a handle through a row of balls is already known from Japanese Laid-Open Utility Model Publication No. 178,007/84. The stop valve disclosed in this publication is fashioned, however, such that it is displaced along the axial direction of cylinder head, as is usual in the prior art, and a handle for displacing such valve is arranged so that it is directed upwardly.

Next, two directional control valves or the spools 65 and 66 thereof are designed so that they are operated by a single control lever 210 shown in FIGS. 21 to 24.

To this end, the valve units 108 and 107 are fixedly provided on side walls thereof, respectively, with frame plates 211 and 212 through which the slidable spools 65 and 66 extend so that ends 65a and 66a of such spools are located outwardly of the plates 211 and 212. The frame plate 211 on the valve unit 108 comprises at its top end a sidewardly projected portion 211a to which a support sleeve 213 disposed in parallel with spool 65 is secured by welding at the upper face of the portion 211a. Control lever 210 is secured at its horizontal lower end portion 210a by welding to a connector member 214 having a C-letter-shaped cross-section and having an open bottom. A horizontal first pivot 216 is provided which is fitted at one end thereof into one end portion of the connector member 214 and is secured to such member 214 by a horizontal pin 215 extending along a direction perpendicular to the pivot 216. This pivot 216 is rotatably received at its the other end portion by the support sleeve 213 so that the control lever 210 may be revolved about the axis of the first pivot 216 forwardly and backwardly along arrow A shown in FIG. 22. Another support sleeve 217 is provided which is fitted in the opposite end portion of connector member 214 and is secured to such member by welding. This support sleeve 217 rotatably supports a pin 218 to which an arm 219 is secured at its top end by welding. This arm 21 is opposed at its lower end to the end 65a of spool 65 and is connected to such end 65a by a pair of elongated connecting pieces 220 and pins 221 and 222 located at both ends of the pieces 220.

To the frame plate 212 on the valve unit 107 is fixedly secured a bracket 223 which is spaced from and in parallel with the spool 66. This bracket 223 rotatably supports through a pin 224 a pair of bell cranks 225 having downwandly extending arm portions which are connected at the lower ends thereof to the end 66a of spool 66 by a pin 226. The aforesaid horizontal pin 25 for securing the first pivot 216 to connector member 214 is projected relatively largely from the member 214, as clearly shown in FIG. 24. A vertical connecting arm 227 is provided which is supported at the upper end thereof rotatably by the pin 215 and is connected at the lower end thereof to a horizontal arm portions of the bell cranks 225 by means of pin 228. It is thus seen that the control lever 210 is supported so that it may also be revolved about the axis of the horizontal pin 215, which acts as a second pivot for the lever 210, leftwardly and rightwardly along arrow B shown in FIG. 21. In FIGS. 23 and 24, numerals 229 and 230 designate snap rings which are fitted at the inner edge portions thereof respectively in annular grooves formed to outer peripheral surfaces of the free end portions of the pivot 216 and pin 218 for preventing such pivot 216 and pin 218 from getting out of the support sleeves 213 and 217.

When the single lever 210 is revolved by operator on the seat 34 about the axis of pivot 216 in a forward and backward direction along arrow A shown in FIG. 22 so as to rotate the connector member 214 about the axis of pivot 216, the horizontal pin 216 is revolved about the axis of pivot 216 to cause a movement of the arm 227 in a vertical direction so that the bell cranks 225 are revolved about the pin 224. Position of the pin 226 for connecting such bell cranks 225 to the spool 66 is thus changed so that such spool 66 is displaced along its axial direction. Conversely, when the control lever 210 is operated so as to revolve same about the axis of pin 215 in a leftward and rightward direction along arrow B shown in FIG. 21 so as to rotate the connector member 214 about the axis of pin 215, arm 219 is revolved about the axis of pin 215 to cause a displacement of pin 221 located at the lower end of such arm 219. The spool 65 is thus displaced along its axial direction through the connecting pieces 220.

Compared to the control mechanism employed in the first embodiment in which two control levers 136 and 137 are used for operating two directional control valves 65 and 66 selectively, the mechanism having been detailed hereinbefore in which a single lever 210 is employed for the same purpose is simpler in structure. Such single control lever 210 for two valves 65 and 66 will also contribute to minimize limitation on the arrangement of a plurality of levers and similar handling means which must be arranged so as to avoid any interferences therebetween. Meanwhile, control mechanism comprising a single lever for operating two directional control valves for a front loader or the like is already known to the art as shown in Japanese Laid-Open Utility Model Publications No. 18,677/82 and No. 194,255/83.

We claim:

1. In a working vehicle having a hydraulic lift mechanism, mounted on the top of rear end portion of the vehicle frame for use in lifting and lowering a working implement drawn by the vehicle, and a seat located above a cylinder case of said hydraulic lift mechanism, a fluid supply system which comprises: a first control valve assembly mounted on an outer wall surface of said cylinder case for controlling operation of said hydraulic lift cylinder, said wall surface extending along the longitudinal direction of the vehicle; a second control valve assembly having therein at least one directional control valve for controlling operation of at least one fluid-operated working implement equipped to the vehicle, said second control valve assembly permitting therethrough supply of fluid to said first control valve assembly; and a single hydraulic pump for supplying operating fluid selectively to one of said hydraulic lift cylinder and said fluid-operated working implement with which the vehicle is equipped characterized in that a stop valve (52) for said hydraulic lift cylinder (39) is disposed within a cylinder head (81) of said cylinder case (33) so as to be displaced along a direction across the vehicle by a handle 95; which is arranged at a side of said cylinder case; and that the front of said cylinder head (81) is formed with a vertical seating surface (96) on which said second control valve assembly (50) is fixedly mounted in a horizontal posture so as to be disposed below a front end portion of said seat (34) with an interval therebetween said directional control valve (65, 66) having one end (65a, 66a) projected outwardly toward a side opposite to said handle (95; 295), a control mechanism for displacing said directional control valve being connected operatively to said one end.

2. A fluid supply system as claimed in claim 1, characterized in that an arch-shaped frame (129) for supporting said seat (34) is fixedly mounted on the top of vehicle frame so that one of the legs (129a) is located at a side of said cylinder head (81), control mechanism (134, 135, 136, 137, 138, 139, 140, 141) for said second control valve assembly (50) being supported by said one of the legs.

3. A fluid supply system as claimed in claim 1, characterized in that said second control valve assembly (50) comprises a forwardly opening inlet port (62P), rearwardly opening fluid supply port (62F) for supplying fluid to said first control valve assembly (49), rearwardly opening fluid drainage port (62T), and upwardly opening outlet ports (62A, 62B, 64A, 64B).

4. A fluid supply system as claimed in claim 3, characterized in that said second control valve assembly (50) is divided into plural valve units (107, 108) each including therein a directional control valve (65, 66) and a cover (109) formed with said inlet port (62P), said valve units and cover being arranged and piled successively from the front end of said cylinder head (81) forwardly and being fastened together to said cylinder head.

5. A fluid supply system as claimed in claim 3, characterized in that a cover (109) formed with said inlet port (62P) is provided at the front end of said second control valve assembly (50), said cover being formed further with a forwardly opening fluid pressure-supply port (62S) and including therein a flow divider (48) for dividing fluid flowing in said inlet port into two parts one of which is supplied to directional control valves (65, 66) in said second control valve assembly and the other of which is supplied to said fluid pressure-supply port.

6. A fluid supply system as claimed in claim 5, characterized in that said cover (109) further includes a relief valve (67) for determining fluid pressure applied to said fluid-operated working implement and to said hydraulic lift cylinder (39).

* * * * *